Patented July 20, 1948

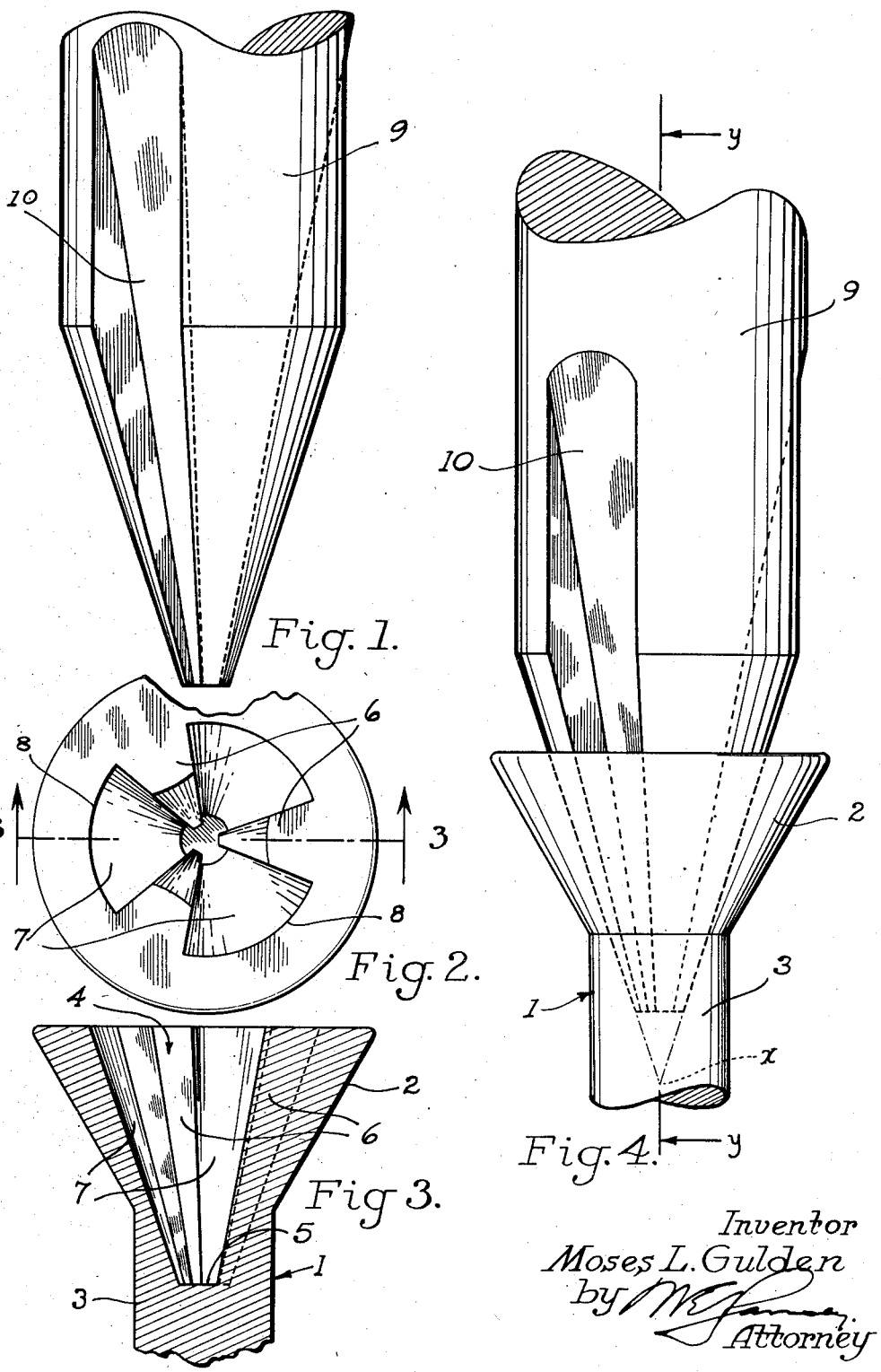

2,445,525

UNITED STATES PATENT OFFICE 2,445,525

FASTENING DEVICE

Moses L. Gulden, Milwaukie, Oreg.

Application February 19, 1945, Serial No. 578,671

4 Claims. (Cl. 85—45)

My invention relates specifically to screws, bolts and other types of threaded rotatable fastening devices, and has for its particular object the provision of a recess in the head for a tool such as a screwdriver, which firmly and securely engages the driving end of said tool and applies all of the driving force to produce rotation of the screw.

A further and more specific object of my invention is to provide a fastening device and a driving tool therefor which may be made precisely complementary with ordinary manufacturing facilities. To this end all of the matching surfaces are tapered and are plane, except the peripheral surfaces which are circular. All of the parts are concentric about a longitudinal axis, which is the axis about which the screw and the driver turn, and all of the parts are symmetrical about said axis.

Further details of my invention and the mode of operation thereof are hereinafter described with reference to the accompanying drawings, in which:

Fig. 1 is a fragmentary perspective view of the head of a driving tool for engaging a screw or other fastening device embodying my invention;

Fig. 2 is a fragmentary plan view of the head of such device;

Fig. 3 is a longitudinal section taken on the line 3—3 in Fig. 2; and

Fig. 4 is a fragmentary elevation of a tool and a fastening device in engagement showing in dotted outline the engaging parts and the common point toward which all edges converge.

My invention is directed toward a screw 1. It is to be understood that this is cited only by way of example and my invention has application to any kind of fastening device having a head on one end and screw threads at the other. Other types of fastening devices of this character are bolts, cap screws, set screws, and similar devices. Said screw is formed with an enlarged head 2.

The form of recess with which my invention is particularly directed is made to retain sufficient material to provide structural strength in the head and in the body of the screw to serve its normal purpose. Thus a shallow headed screw or bolt might have a recess which converges rather sharply within the confine of the head, while in one with a so-called counter-sunk head, such as is shown, said recess might extend down into a shank 3 of said screw. Said recess 4 is generally of conical form. The bottom 5 is preferably flattened so that said recess really is frusto-conical, extending inwardly along lines radiating from the longitudinal center line y—y defining wings 6. Said wings also taper toward a common focal point x indicated in Fig. 4, which lies on said center line y—y.

The spaces 7 between said wings preferably are of larger cross-sectional area than that of the wings and their peripheries are formed on circular arcs 8 concentric with said center line. Thus the driver or operating tool 9 has a tapered circular bearing point about the major portion of its perimeter to produce a snug fit and to permit alinement. The fact that all lines lead to a common focal axis or point permits the driver to be inserted in the recess with all parts matching exactly. That is, the engaging surfaces of the driver and the recess are formed either by plane surfaces or curved surfaces generated from a common center, which also is the center line of the tool, the screw and the recess.

It is desirable that all of the matching surfaces of the tool and of the recess be complementary so that there is little play, which would tend to twist and mash the engaging parts. That is, it is desirable that all of the force applied to turn the tool be transmitted to the screw. Thus, because the engaging side faces of the wings and the complementary grooves 10 of the driver are plane and radial, they always lie normal to the twisting force and thus resist said forces over their entire areas. I deem this an important point in my invention.

It is generally recognized that it is easier to make a plane surface or a concentric curved surface than any other two types of surfaces, and thus the matching of the parts of the driver and of the recess in the screw are more easily made and maintained.

Because of the fact that the driver and the recess are conical the driver may accommodate a relatively large range of recesses. That is, as is shown in Fig. 4, the driver is inserted approximately three-quarters of its length into the recess. With smaller screws having shallower recesses it might be possible to engage said screw when the driver projects only one-quarter of its length into the recess. On the other hand, a larger screw might be matched by having the tool completely inserted in the recess.

I claim:

1. A screw having a head, a screwdriver receiving recess formed therein, said recess being of conical form and having wings projecting radially inwardly from the general sweep of the recess, said wings alternating with spaces between them, said wings terminating short of the center-line of said screw, thus leaving an uninterrupted portion of said recess at said centerline, said wings being narrower than the spaces between them, said spaces thus having substantial circular bearing surfaces, respectively, lying in the sweep of said conical recess for a complementarily formed screwdriver seated in said recess.

2. A screw having a head, a screwdriver receiving recess formed therein, said recess having wings projecting radially inwardly from the general sweep of the recess, said wings alternating with spaces between them, and said wings terminating short of the centerline of said screw, thus leaving an uninterrupted portion of said recess at said centerline, said recess being frusto-conical in longitudinal section and concentric with the longitudinal centerline of said screw.

3. The combination as set out in claim 2, herein, modified in that each of said wings taper uniformly toward said centerline and have plane radial side surfaces which thus are disposed normal to any rotative twisting force applied by a screwdriver seated in said recess.

4. The combination as set out in claim 3, herein, modified in that said wings are narrower than the spaces between them, said spaces thus having substantial circular bearing surfaces, respectively, lying in the sweep of said conical recess for a complementarily formed screwdriver seated in said recess.

MOSES L. GULDEN.

REFERENCES CITED

The following references are of record in the file of this patent:

UNITED STATES PATENTS

| Number | Name | Date |
|---|---|---|
| 255,459 | Rogers | Mar. 28, 1882 |
| 2,062,383 | West | Dec. 1, 1936 |
| 2,285,461 | Purtell | June 9, 1942 |

FOREIGN PATENTS

| Number | Country | Date |
|---|---|---|
| 668,663 | France | July 16, 1929 |